(12) United States Patent
Kim et al.

(10) Patent No.: US 12,443,071 B2
(45) Date of Patent: Oct. 14, 2025

(54) OPTICAL STACK AND MANUFACTURING METHOD THEREFOR, AND SMART WINDOW COMPRISING SAME AND VEHICLE OR BUILDING WINDOW TO WHICH SAME IS APPLIED

(71) Applicant: DONGWOO FINE-CHEM CO., LTD., Iksan-si (KR)

(72) Inventors: Dong-Hwi Kim, Sejong (KR);
Seung-Won Song, Seoul (KR);
Hong-Jun Ahn, Seoul (KR);
Pyoung-Yun Oh, Pyeongtaek-si (KR);
Yu-Jin Lee, Goyang-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 18/566,596

(22) PCT Filed: May 27, 2022

(86) PCT No.: PCT/KR2022/007590
§ 371 (c)(1),
(2) Date: Dec. 1, 2023

(87) PCT Pub. No.: WO2022/255741
PCT Pub. Date: Dec. 8, 2022

(65) Prior Publication Data
US 2024/0280854 A1 Aug. 22, 2024

(30) Foreign Application Priority Data

Jun. 4, 2021 (KR) .................. 10-2021-0072854

(51) Int. Cl.
*G02F 1/1335* (2006.01)
*G02B 5/30* (2006.01)
(Continued)

(52) U.S. Cl.
CPC ..... *G02F 1/133528* (2013.01); *G02B 5/3016* (2013.01); *G02B 5/305* (2013.01);
(Continued)

(58) Field of Classification Search
None
See application file for complete search history.

(56) References Cited

U.S. PATENT DOCUMENTS

2008/0158499 A1   7/2008  Lai et al.
2016/0291357 A1*  10/2016 Min .................... G02B 5/3016
(Continued)

FOREIGN PATENT DOCUMENTS

JP     2017-211453 A    11/2017
JP     2018-10035 A      1/2018
(Continued)

OTHER PUBLICATIONS

Korean Office Action issued on Jul. 26, 2024, in counterpart Korean Patent Application No. 10-2022-0158619 (8 pages in English, 8 pages in Korean).
(Continued)

*Primary Examiner* — Phu Vu
(74) *Attorney, Agent, or Firm* — NSIP Law

(57) ABSTRACT

The present invention relates to a transmittance variable optical stack and a manufacturing method therefor, and a smart window comprising same and a vehicle to which the same is applied, the optical stack comprising polarizing plates stacked on both surfaces thereof with a liquid crystal layer, driven according to an electric field, interposed therebetween, wherein the polarizing plates comprise a polarizer and a protective layer formed on at least one surface of the polarizer, a transparent conductive layer is formed in direct
(Continued)

contact with the polarizing plate, and the optical stack has a total light transmittance that changes according to the application of voltage.

16 Claims, 11 Drawing Sheets

(51) Int. Cl.
  *G02F 1/13363* (2006.01)
  *G02F 1/1339* (2006.01)
(52) U.S. Cl.
  CPC ..... *G02B 5/3083* (2013.01); *G02F 1/133502* (2013.01); *G02F 1/13363* (2013.01); *G02F 1/13396* (2021.01)

(56) References Cited

U.S. PATENT DOCUMENTS

2019/0162991 A1    5/2019  Hagiwara
2022/0413326 A1*  12/2022  Li .......................... G06F 3/013

FOREIGN PATENT DOCUMENTS

| | | |
|---|---|---|
| KR | 10-2007-0094188 A | 9/2007 |
| KR | 10-2008-0066658 A | 7/2008 |
| KR | 10-2014-0026291 A | 3/2014 |
| KR | 10-2015-0033822 A | 4/2015 |
| KR | 10-2015-0067038 A | 6/2015 |
| KR | 10-2015-0105266 A | 9/2015 |
| KR | 10-2016-0065030 A | 6/2016 |
| KR | 10-2017-0064744 A | 6/2017 |
| KR | 10-2017-0072573 A | 6/2017 |
| KR | 10-2018-0030564 A | 3/2018 |
| KR | 10-2018-0059445 A | 6/2018 |
| KR | 10-2019-0028657 A | 3/2019 |
| KR | 10-2020-0050750 A | 5/2020 |
| KR | 10-2020-0054072 A | 5/2020 |
| KR | 10-2021-0000887 A | 1/2021 |
| KR | 10-2021-0049688 A | 5/2021 |
| WO | WO 2008/027031 A2 | 3/2008 |
| WO | WO 2021/105070 A1 | 6/2021 |

OTHER PUBLICATIONS

Extended European search report issued on Sep. 11, 2024, in counterpart European Patent Application No. 22816400.0.

* cited by examiner

OPTICAL STACK AND MANUFACTURING METHOD THEREFOR, AND SMART WINDOW COMPRISING SAME AND VEHICLE OR BUILDING WINDOW TO WHICH SAME IS APPLIED

CROSS-REFERENCE TO RELATED APPLICATIONS

This application is a U.S. National Stage Application of International Application No. PCT/KR2022/007590 filed on May 27, 2022, which claims priority to Korean Application No. KR 10-2021-0072854 filed on Jun. 4, 2021, in the Korean Intellectual Property Office, and all the benefits accruing therefrom under the priority, the content of which in their entireties are herein incorporated by reference.

TECHNICAL FIELD

The present disclosure relates to a variable transmittance optical stack and a manufacturing method therefor, and a smart window including the same and a window and a door for a vehicle or a building to which the same is applied.

BACKGROUND ART

In general, there are many cases in which an external light blocking coating is applied to a window of a means of transportation such as a vehicle. However, a transmittance of a conventional window of a means of transportation is fixed, and a transmittance of the external light blocking coating is also fixed. Therefore, the entire transmittance of the conventional window of the means of transportation is fixed, thereby causing an accident. For example, when the entire transmittance is preset low, there is no problem during day when ambient light is sufficient. However, there is a problem in that it is difficult for a driver or the like to properly check the surroundings of the means of transportation at night when ambient light is insufficient. Alternatively, when the entire transmittance is preset high, there is a problem of causing glare to a driver or the like during day when ambient light is sufficient. Accordingly, a variable transmittance optical stack capable of changing the transmittance of light when a voltage is applied has been developed.

The variable transmittance optical stack is driven by changing the transmittance by driving liquid crystal according to application of voltage. The variable transmittance optical stack developed so far is manufactured by patterning a conductive layer for driving liquid crystal on a separate or additional substrate, and then combining the conductive layer with other elements such as a polarizing plate.

For example, Japanese Patent Publication Application No. 2018-010035 discloses a variable transmittance optical stack including a transparent electrode layer formed on a polycarbonate (PC) substrate having a predetermined thickness.

However, when a separate or additional substrate is included to form the conductive layer as described above, as a manufacturing process becomes complicated, manufacturing costs is increased, the thickness of the stack is increased, and the transmittance changes due to occurrence of phase difference.

Accordingly, there is a need to develop a variable transmittance optical stack capable of simplifying a manufacturing process, reducing the thickness by excluding a separate or additional substrate for forming a conductive layer.

DISCLOSURE

Technical Problem

The present disclosure is intended to provide a variable transmittance optical stack with simplified manufactured process by excluding a separate or additional substrate for forming a conductive layer.

Another objective of the present disclosure is to provide a variable transmittance optical stack in which the thickness is significantly reduced by excluding a separate or additional substrate for forming a conductive layer.

Yet another objective of the present disclosure is to provide a smart window including the variable transmittance optical stack, and a window and a door for a vehicle or a building, to which the same is applied.

However, the problem to be solved by the present disclosure is not limited to the problems mentioned above, and other problems not mentioned will be clearly understood by those skilled in the art from the description below.

Technical Solution

The present disclosure relates to a variable transmittance optical stack, the optical stack including polarizing plates stacked on both surfaces thereof with a liquid crystal layer driven in response to an electric field, wherein each polarizing plate includes a polarizer and a protective layer formed on at least one surface of the polarizer, and a transparent conductive layer is formed by directly contacting with each polarizing plate, and a total light transmittance of the optical stack changes in response to application of voltage.

In a first aspect of the present disclosure, the transparent conductive layer may be formed by directly contacting with each of the polarizing plates without a separate or additional substrate between each of the polarizing plates and the transparent conductive layer.

In a second aspect of the present disclosure, the transparent conductive layer may be formed by directly contacting with each of the polarizing plates with a highly adhesive layer between each of the polarizing plates and the transparent conductive layer.

In a third aspect of the present disclosure, the transparent conductive layer may include one or more types selected from a group consisting of transparent conductive oxide, metal, carbonaceous material, conductive polymers, conductive ink, and nanowires.

In a fourth aspect of the present disclosure, each of the polarizing plates may further include an optical functional layer.

In a fifth aspect of the present disclosure, the optical functional layer may include a retardation film.

In a sixth aspect of the present disclosure, the protective layer may include one or more types selected from a group consisting of polyethylene terephthalate, polyethylene isophthalate, polyethylene terephthalate, polybutylene terephthalate, cellulose diacetate, cellulose triacetate, polycarbonate, polyethylene, polypropylene, polymethyl (meth) acrylate, polyethyl (meth) acrylate, and cyclic olefin-based polymer.

In a seventh aspect of the present disclosure, the optical stack may include a refractive index-matching layer between each of the polarizing plates and the transparent conductive layer, the refractive index-matching layer having a refractive index ranging from 1.4 to 2.6.

In an eighth aspect of the present disclosure, each polarizing plate may have a thickness ranging from 30 to 200 μm.

In a ninth aspect of the present disclosure, the liquid crystal layer may include an alignment film formed on at least one surface thereof.

In a tenth aspect of the present disclosure, the liquid crystal layer may be driven by any one driving method selected from a group consisting of twisted nematic, super-twisted nematic, in-plane switching, fringe field switching, pane line switching, advanced high-performance IPS, polymer sustained alignment, and vertical alignment.

In an eleventh aspect of the present disclosure, the liquid crystal layer may include one or more types selected from a group consisting of a ball spacer and a column spacer.

In a twelfth aspect of the present disclosure, the ball spacer may have a diameter ranging from 1 to 10 μm.

In a thirteenth aspect of the present disclosure, the ball spacer may have an occupancy area in the liquid crystal layer, which ranges from 0.01 to 10% of the area of the liquid crystal layer.

The present disclosure relates to a manufacturing method for the variable transmittance optical stack.

The present disclosure relates to a smart window including the variable transmittance optical stack.

The present disclosure relates to a vehicle in which the smart window is applied to at least one of front windows, rear windows, side windows, sunroof windows, or inner partitions thereof.

The present disclosure relates to a window and a door for a building including the smart window.

Advantageous Effects

The variable transmittance optical stack according to the present disclosure does not include a separate or additional substrate for forming the conductive layer as the conductive layer is directly formed on one surface of the polarizing plate, so that the thickness thereof may be significantly reduced in comparison to the thickness of the conventional optical stack.

Furthermore, the variable transmittance optical stack according to the present disclosure is configured to omit the process of forming a conductive layer on a substrate for the conventional optical stack and bonding the conductive layer and other members, so the manufacturing process thereof can be simplified in comparison to the conventional optical stack.

BEST MODE

Figure 1:
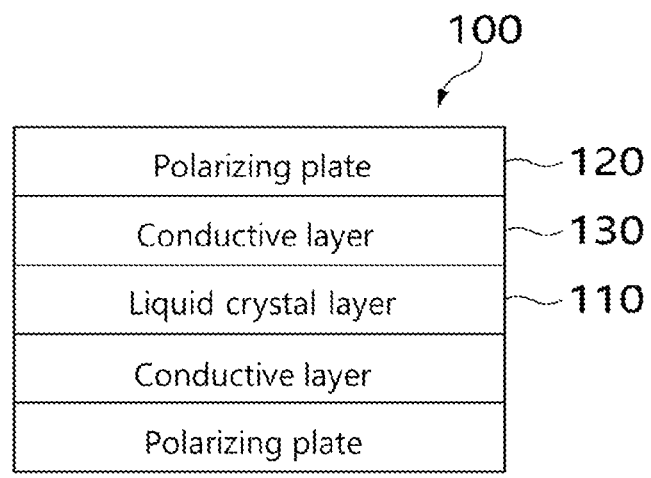
FIG. 1 is a view showing a stack structure of a variable transmittance optical stack according to an embodiment of the present disclosure.

The present disclosure relates to a variable transmittance optical stack, wherein since a conductive layer for driving liquid crystal is directly formed on one surface of a polarizing plate, the optical stack does not include a separate or additional substrate for forming the conductive layer.

More particularly, the present disclosure relates to a variable transmittance optical stack, the optical stack including polarizing plates stacked on both surfaces thereof with a liquid crystal layer driven in response to an electric field, wherein each polarizing plate includes a polarizer and a protective layer formed on at least one surface of the polarizer, and a transparent conductive layer is formed by directly contacting with each polarizing plate, and a total light transmittance of the optical stack changes in response to application of voltage.

Hereinbelow, embodiments of the present disclosure will be described in detail with reference to drawings. However, the following drawings accompanied to this specification illustrate preferred embodiments of the present disclosure, and serve to further understand the technical idea of the present disclosure with the contents of the above-described invention. Therefore, the present disclosure should not be construed as being limited to material described in the drawings.

Terms used in this specification are selected to describe embodiments and thus do not limit the present disclosure. In this specification, an element expressed in a singular form may be plural elements unless it is necessarily singular in the context.

As used herein, terms "comprise" and/or "comprising" do not mean exclusion of the presence or absence of one or more components, steps, movements and/or elements other than a component, a step, movement, and/or an element mentioned above. The same reference numerals are used throughout the specification to designate the same or similar elements.

Spatially relative terms "below"-"lower surface"-"lower portion", "above"-"upper surface"-"upper portion" may be used to easily describe correlation between "one element or components" and "another element or other components", as shown in drawings. The spatially relative terms should be understood as terms including different directions of an element when being used or operated in addition to a direction shown in the drawings. For example, when an element shown in the drawings is turned over, the element described as being "below" or "lower" with respect to another element may be placed "on" the another element. Accordingly, the exemplary term "below" may include both downward and upward directions. An element may be aligned in a different direction, and accordingly, the spatially relative terms may be interpreted according to orientation.

A "planar direction" used in this specification may be interpreted as a direction perpendicular to a polarizing plate and/or a transparent conductive layer, that is, a direction viewed from the user's view side.

MODE FOR INVENTION

FIG. 1 is a view showing a stack structure of a variable transmittance optical stack 100 according to an embodiment of the present disclosure. According to the embodiment of the present disclosure, the variable transmittance optical stack 100 includes a liquid crystal layer 110, a polarizing plate 120, and a transparent conductive layer 130. According to the embodiment of the present disclosure, a total light transmittance of the variable transmittance optical stack 100 may vary in response to application of voltage. For example, the total light transmittance of the optical stack 100 may range from 5 to 45% in response to application of voltage.

Therefore, the variable transmittance optical stack of the present disclosure is particularly suitable for technical fields where light transmittance can be changed in response to application of voltage, and for example, may be used for a smart window.

The smart window is a window controlling the amount of light or heat passing through the window by changing light transmittance in response to an electrical signal. In other words, the smart window is provided to be changed into a transparent, opaque or translucent state by voltage and is called variable transmittance glass, lighting control glass, or smart glass.

The smart window may be used as partitions for partitioning an internal space of vehicles and buildings or for protecting privacy, or as skylights arranged in openings of buildings, and may be used as highway signs, noticeboards, scoreboards, clocks or advertising screens, and may be used to replace glass of a means of transportation, such as windows or sunroof windows of cars, buses, aircrafts, ships, or trains.

The variable transmittance optical stack of the present disclosure may also be used for the smart window of the various technical fields mentioned above, but since the transparent conductive layer 130 is directly formed in the polarizing plate 120, there is no need to include a separate or additional substrate for forming the transparent conductive layer 130 and the thickness thereof is thin and is advantageous in the flexuosity, so the optical stack of the present disclosure may be used to be particularly suitable for a smart window of a vehicle or a building. According to one or a plurality of embodiments, the smart window to which the variable transmittance optical stack of the present disclosure is applied may be used for front windows, rear windows, side windows, and sunroof windows of a vehicle, or windows for a building. Furthermore, the smart window may be used to not only an external light blocking use, but also an internal space partitioning use or a privacy protecting use such as an inner partition for a vehicle or a building.

The liquid crystal layer 110 is characterized to be driven in response to an electric field. The liquid crystal layer 110 may be located between first and second polarizing plates that are located in a light control region of the optical stack 100. According to the embodiment, the liquid crystal layer 110 may be located in a space provided by a sealant layer and a spacer between the first and second polarizing plates, in the light control region. Furthermore, the liquid crystal layer 110 may adjust transmittance of light incident from an external light source in response to an electric field formed between first and second conductive layers.

According to one or a plurality of embodiments, the liquid crystal layer 110 may be driven by any one driving method selected from a group consisting of twisted nematic (TN), super-twisted nematic (STN), in-plane switching (IPS), fringe field switching (FFS), plane line switching (PLS), advanced high-performance IPS (AH-IPS), polymer sustained alignment (PSA), and vertical alignment (VA), and a driving method for a liquid crystal currently developed or to be developed may be applied thereto.

According to another embodiment of the present disclosure, the liquid crystal layer 110 may include one or more types of spacers selected from a group consisting of a ball spacer and a column spacer, and specifically, it is preferable that the included spacer is a ball spacer. The ball spacer may include one or more ball spacers, and preferably has a diameter ranging from 1 to 10 μm. Furthermore, when viewed in a planar direction, a region where the ball spacer is occupied in the liquid crystal layer 110 (i.e., light control region) preferably ranges from 0.01 to 10% of the area of the liquid crystal layer 110 in an aspect of improvement of user's visibility and a transmittance in a light transmissivity mode.

The polarizing plate 120 may include a polarizer and a protective layer formed on at least one surface of the polarizer. The two different polarizing plates 120 may be located on both surfaces of the liquid crystal layer 110. When the polarizing plates 120 are located on the both surfaces of the liquid crystal layer 110, an angle between the absorption axes of the two different polarizing plates 120 may be formed to be vertical or horizontal, and moreover, in order to secure the minimum transmittance, the angle may preferably be formed at an angle ranging from 5 to 85 degrees. The polarizing plate 120 may transmit sporadically poured light in one direction, and may regulate the amount of light passing through the polarizing plate 120 by using polarization characteristics thereof to adjust the transmittance of the optical stack. The protective layer may be a member for preserving the polarization characteristic of the polarizer from a post-processing and external environment. According to the embodiment, the protective layer may serve to provide a structural base to allow the transparent conductive layer 130 to be described below to be formed. At this point, the protective layer is preferably formed to have characteristics facilitating formation of the transparent conductive layer 130.

The protective layer may only be provided on one surface of the polarizer, and may be provided on both surfaces of the polarizer. When the polarizing plate 120 includes a plurality of protective layers, the two different protective layers may contain substantially identical or similar substances. According to one or a plurality of embodiments, the protective layer may include: polyester-based resins such as polyethylene terephthalate, polyethylene isophthalate, polyethylene naphthalate, polybutylene terephthalate, and the like; cellulose-based resins such as cellulose diacetate, cellulose triacetate, and the like; polycarbonate-based resins; polyethylene resins; polypropylene resins; acryl-based resins such as polymethyl (meth) acrylate, polyethyl (meth) acrylate, and the like; and cyclic olefin-based polymer (COP), and the like.

The polarizer of each of the polarizing plates 120 may include a stretched polarizer, or may be formed into a stretched polarizing plate. According to an embodiment, the stretched polarizer may include a stretched polyvinyl alcohol (PVA)-based resin. The PVA-based resin may be PVA-based resin obtained by saponifying polyvinyl acetate resin. In addition to polyvinyl acetate that is homopolymer of vinyl acetate, vinyl acetate and a copolymer with other monomers that can be copolymerized with vinyl acetate may be used as the polyvinyl acetate-based resin. As the other monomers, unsaturated carboxylic acid-based monomers, unsaturated sulfonic acid-based monomers, olefin-based monomers, vinyl ether-based monomers, acrylamide having ammonium groups-based monomers, and the like may be used. Furthermore, the PVA-based resin contains a denatured resin, and for example, may be polyvinyl formal or polyvinyl acetal denatured into aldehyde.

Furthermore, the polarizing plate 120 may include a coated polarizer. According to an embodiment, the coated polarizer may be formed of a composition for liquid crystal coating, and for example, may be formed by coating the composition for liquid crystal coating on an upper surface of the protective layer. At this point, the composition for liquid crystal coating may contain reactive liquid crystal compound, and dichroic dye.

The reactive liquid crystal compound may contain reactive mesogen (RM) capable of expressing liquid crystalline, and/or polymerizable functional group and may contain a monomeric molecule, etc. having a liquid crystal phase after cross-linking reaction by heat or light. When the reactive liquid crystal compound is polymerized by light or heat, polymer network may be formed while liquid crystal arrangement is maintained. As the reactive liquid crystal compound is used, the polarizer of a thin film shape with improved mechanical and thermal stability while maintaining the optically anisotropic or dielectric permittivity characteristic of liquid crystal may be formed.

The dichroic dye is a substance contained in the composition for liquid crystal coating to impart the polarization characteristic, and has a characteristic in which absorbance in a direction of long axis of molecule and absorbance in a direction of short axis are different. The dichroic dye may be a dichroic dye currently developed or to be developed. For example, the dichroic dye may contain acridine dye, oxazine dye, cyanin dye, naphthalene dye, azo dye, anthraquinone dye, and the like may be used, and these may be used alone or in combination.

The composition for liquid crystal coating may contain a solvent capable of dissolving the reactive liquid crystal compound and the dichroic dye. For example, propylene glycol monomethyl ether acetate (PGMEA), methyl ethyl ketone (MEK), xylene, chloroform, and the like may be used. Furthermore, the composition for liquid crystal coating may contain leveling agents, polymerization initiators, etc. within a range that does not deteriorate the polarization characteristic of a coating film.

Furthermore, the polarizing plate 120 may be formed with a member having orientation. For example, the polarizing plate 120 may be formed by coating and hardening composition for alignment film coating containing aligned polymers, photopolymerization initiators, and solvent on each protective layer to form the member having orientation, then by coating and curing the composition for liquid crystal coating on the member. Although the aligned polymer is not particularly limited, the aligned polymer may be polyacrylate-based resin, polyamic resin, polyimide-based resin, polymer having cinnamate groups, etc. and may use polymer capable of expressing orientation, the polymer may be currently developed or will be developed.

According to an embodiment, the polarizing plate may include an overcoat layer. For example, the overcoat layer may be located on an upper surface of a layer formed by the composition for liquid crystal coating and may be provided to face the member having the characteristic of the alignment film. According to some embodiments, a protective film may be additionally provided on an upper surface of the overcoat layer. In this case, the polarizing plate may have a stack structure of a member having orientation-a layer formed by the composition for liquid crystal coating-an overcoat layer-a protective film. Accordingly, the mechanical durability can be further improved while maintaining a transmittance at a constant level.

The polarizing plate 120 may include an optical functional layer in order to improve the optical characteristic of the optical stack. The optical functional layer may be provided on at least one surface of the protective layer, for example, may be provided on the upper surface of the protective layer. The optical functional layer is not particularly limited as long as it can reinforce or supplement the optical function of the polarizing plate 120. For example, in order to delay the phase of light passing through the liquid crystal layer, the optical functional layer may be a retardation film such as a quarter-wave plate (¼ wave plate), a half-wave plate (½ wave plate), and may be used alone or in combination. The retardation film may be produced with an obliquely stretched resin film, a liquid crystal coating layer, etc., and a retardation film currently developed or to be developed may be use therefor.

According to an embodiment, the polarizing plate 120 may have a thickness ranging from 30 to 200 μm, and preferably a thickness ranging from 30 to 170 μm, and more preferably a thickness ranging from 50 to 150 μm. In this case, while the polarizing plate 120 maintains the optical characteristic, the optical stack having a thin thickness can be manufactured.

The polarizing plate 120 may have an incurvate shape in order to manufacture the optical stack having a curved surface, and for example, may be formed to be curved towards either of the two different polarizing plates 120 that are stacked on both surfaces of the liquid crystal layer 110.

The transparent conductive layer 130 may be formed on one surface of each polarizing plate 120, and particularly, may be formed in directly contact with the polarizing plate 120. Forming the transparent conductive layer 130 in directly contact with the polarizing plate 120 means that the transparent conductive layer 130 shares a contact surface with the polarizing plate 120 so as to be provided on the polarizing plate 120 without a separate or additional substrate. For example, forming the transparent conductive layer 130 in directly contact with the polarizing plate 120 may mean that the transparent conductive layer 130 may be formed by being deposited on the upper surface of the protective layer formed at the polarizing plate 120.

According to an embodiment, in order to improve the adhesion between the transparent conductive layer 130 and the polarizing plate 120, the transparent conductive layer 130 may be formed by performing pre-processing such as a corona processing or a plasma processing on one surface of each polarizing plate, and then directly contacting with the surface of each polarizing plate to which the pre-processing is performed. The pre-processing is not limited to the corona processing or the plasma processing, and may be a pre-processing currently developed or to be developed without harming the purpose of the present disclosure.

According to another embodiment of the present disclosure, in order to improve the adhesion between the transparent conductive layer 130 and the polarizing plate 120, the transparent conductive layer 130 may be formed by directly contacting with each polarizing plate with the highly adhesive layer located therebetween, the highly adhesive layer being provided on one surface of each polarizing plate.

The transparent conductive layer 130 preferably has the transmittance with respect to visible light of 50% or more, and for example, may include one or more types selected from a group consisting of transparent conductive oxide, metal, carbonaceous material, conductive polymers, conductive ink, and nanowires, but the present disclosure is not limited thereto, and a material of a transparent conductive layer currently developed or to be developed may be used.

According to one or a plurality of embodiments, the transparent conductive oxide may include one or more types selected from a group consisting of indium tin oxide (ITO), indium zinc oxide (IZO), indium zinc tin oxide (IZTO), aluminum zinc oxide (AZO), gallium zinc oxide (GZO), florin tin oxide (FTO), zinc oxide (ZnO), and the like. Furthermore, the metal may include one or more types selected from a group consisting of aurum (Au), argentum (Ag), cuprum (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), alloy containing at least one of them, and the like, and for example, may include argentum-palladium-cuprum (APC) alloy or cuprum-calcium (CuCa) alloy. The carbonaceous material may include one or more types selected from a group consisting of carbon nanotube (CNT), graphene, and the like, and the conductive polymer may include one or more types selected from a group consisting of polypyrrole, polythiophene, polyacetylene, PEDOT, polyaniline, and the like. The conductive ink may be a mixture of metal powder and curable polymer binder, and the nanowires may be for example silver nanowires (AgNW). For example, the transparent conductive layer 130 may be formed by a deposition process such as chemical vapor deposition (CVD), physical vapor deposition (PVD), plasma enhanced chemical vapor deposition (PECVD), and the like, a printing process such as screen printing, gravure printing, reverse offset, ink Jet, and the like, a dry or wet plating process, and the like. Furthermore, the transparent conductive layer 130 may be formed by combining these materials in a structure of two or more layers. For example, in order to reduce the reflectance of incident light and increase the transmittance, the transparent conductive layer 130 may be formed in a structure of two layers including a metal layer and a transparent conductive oxide.

Figure 2:
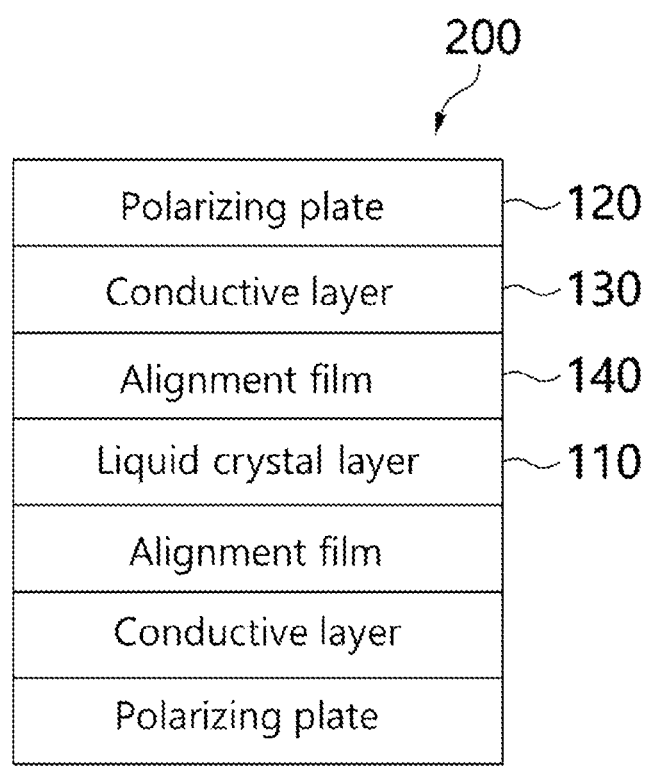
FIG. 2 is a view showing a stack structure of the variable transmittance optical stack to which a second layer is coupled according to another embodiment of the present disclosure.

FIG. 2 is a view showing a stack structure of a variable transmittance optical stack 200 to which a second layer is coupled according to another embodiment of the present disclosure. According to the embodiment of FIG. 2, the optical stack 200 may include the liquid crystal layer 110, the polarizing plate 120, the conductive layer 130, and an alignment film 140 formed on at least one surface of the liquid crystal layer 110.

The alignment film 140 may have substantially the same characteristics as the above-described member having the orientation, and for example, may be formed by applying an aligned material such as polyimide, and the like, and then performing a rubbing process.

Figure 3:
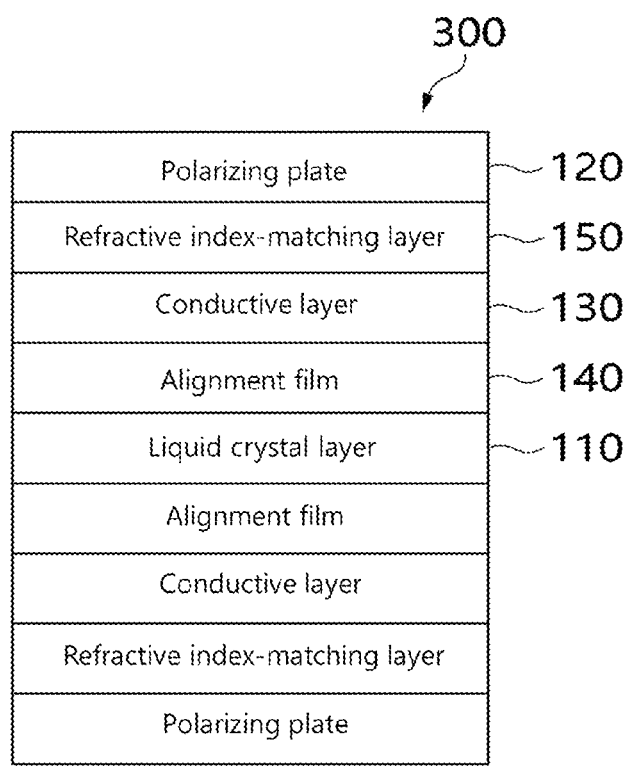
FIG. 3 is a view showing a stack structure of a variable transmittance optical stack to which a second layer is coupled according to another embodiment of the present disclosure.

FIG. 3 is a view showing a stack structure of a variable transmittance optical stack 300 to which a second layer is coupled according to another embodiment of the present disclosure.

According to an embodiment of FIG. 3, the optical stack 300 may include the liquid crystal layer 110, the polarizing plate 120, the transparent conductive layer 130, the alignment film 140, and a refractive index-matching layer 150.

The refractive index-matching layer 150 is provided to compensate for the transmittance difference of the optical stack by the transparent conductive layer 130, and may serve to improve the visible characteristic by reducing the difference of the refractive index. Furthermore, the refractive index-matching layer 150 may be provided to correct a color based on the transparent conductive layer 130. Meanwhile, when the transparent conductive layer 130 has a pattern, the refractive index-matching layer 150 may compensate the transmittance difference of a pattern region and a non-pattern region.

Specifically, the transparent conductive layer 130 is stacked close to other members having a refractive index different therefrom (for example, the polarizing plate 120, etc.), and due to the difference of the refractive index between the transparent conductive layer 130 and another layer close thereto, the difference of optical transmittance may be caused. Specifically, when a pattern is formed on the transparent conductive layer 130, a problem in that the pattern region and the non-pattern region are visually distinguished from each other. Therefore, the refractive index-matching layer 150 is located between each polarizing plate 120 and the transparent conductive layer 130 to compensate for refractive index so as to reduce the difference with the optical transmittance of the optical stack. Specifically, when a pattern is formed on the transparent conductive layer 130, the pattern region and the non-pattern region should be provided so as not to be visually distinguished. The refractive index of the refractive index-matching layer 150 may be preset to be greater than the refractive index of the protective layer of each polarizing plate 120, and to be less than or equal to the refractive index of the transparent conductive layer 130. The refractive index may be properly selected depending on materials of each polarizing plate 120 and the transparent conductive layer 130, but it is preferable that refractive index is an index ranging from 1.4 to 2.6, and more preferably, may be an index ranging from 1.4 to 2.4. As described above, as the refractive index-matching layer 150 is preset as a preset refractive index, optical loss due to a sharply refractive difference between the polarizing plate 120 and the transparent conductive layer 130 can be prevented. The refractive index-matching layer 150 is not particularly limited as long as it can prevent the sharply refractive difference between the polarizing plate 120 and the transparent conductive layer 130. For example, the refractive index-matching layer 150 may be formed from refractive index-matching layer formation composition including polymerizable isocyanate compound.

Figure 4:
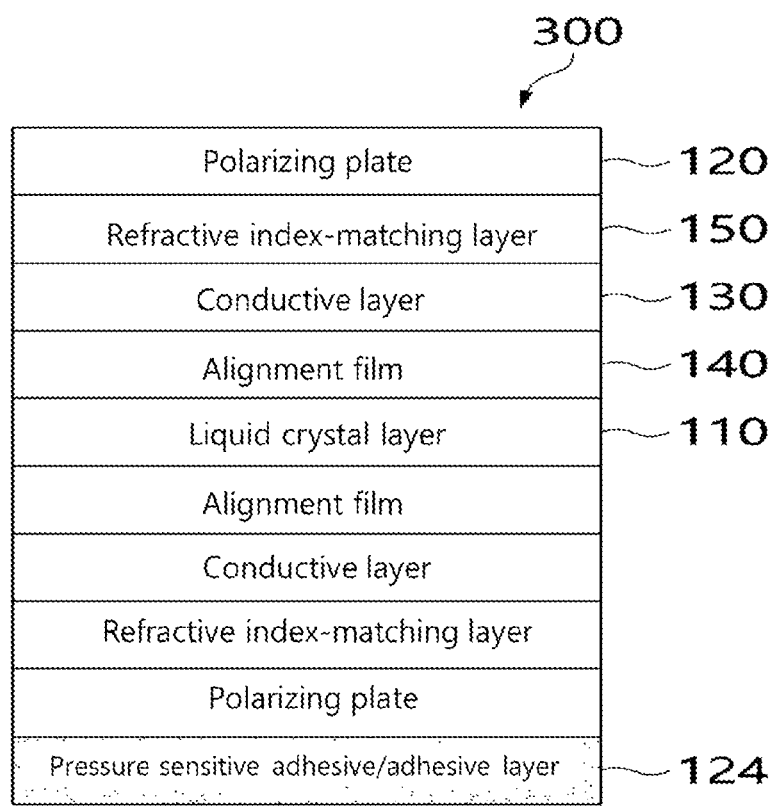
FIG. 4 is a view showing a stack structure of a variable transmittance optical stack in which a pressure sensitive adhesive/adhesive according to another embodiment of the present disclosure is formed on one surface thereof.

FIG. 4 is a view showing a stack structure of a variable transmittance optical stack in which a pressure sensitive adhesive/adhesive according to another embodiment of the present disclosure is formed on one surface thereof.

According to the embodiment of FIG. 4, the optical stack 300 may include a pressure sensitive adhesive/adhesive layer 124 on one surface of the optical stack 300 according to the embodiment of FIG. 3.

The pressure sensitive adhesive/adhesive layer 124 may be formed using an adhesive or a pressure sensitive adhesive, and have appropriate pressure sensitive adhesion/adhesion to prevent peeling, bubbles, and the like, from occurring when handling the optical stack 300, and preferably have transparency and thermal stability.

The adhesive may be an adhesive currently developed or to be developed, for example, may use photocurable adhesive.

The photocurable adhesive provides strong adhesion by being crosslinked and cured by receiving active energy rays such as ultraviolet (UV), electron beam (EB), etc., and may be composed of reactive oligomers, reactive monomers, photopolymerization initiators, and the like.

The reactive oligomers are important components that determine the characteristics of adhesive, and form polymer binding by photopolymerization to form a cured film. For example, the available oligomers may be polyester-based resin, polyether-based resin, polyurethane-based resin, epoxy-based resin, polyacryl-based resin, silicon-based resin, and the like.

The reactive monomers may serve as crosslinker, diluent of the reactive oligomers described above, and affect adhesion characteristics. For example, the available reactive monomers may be monofunctional monomers, multifunctional monomers, epoxy-based monomers, vinyl ethers, cyclic ethers, and the like.

The photopolymerization initiators may absorb light energy to generate radicals or cations to initiate photopolymerization, and a proper type may be selected and used depending on photopolymerization resin.

The pressure sensitive adhesive may use a pressure sensitive adhesive currently developed or to be developed. According to one or a plurality of embodiments, as the pressure sensitive adhesive, acrylic-based pressure sensitive adhesive, rubber-based pressure sensitive adhesive, silicon-based pressure sensitive adhesive, urethane-based pressure sensitive adhesive, polyvinyl alcohol-based pressure sensitive adhesive, polyvinyl pyrrolidone-based pressure sensitive adhesive, polyacrylamide-based pressure sensitive adhesive, cellulose-based pressure sensitive adhesive, vinylalky ether-based pressure sensitive adhesive, and the like. The pressure sensitive adhesive is not particularly limited as long as it has pressure sensitive adhesion and viscoelasticity. For ease of acquisition, preferably, the pressure sensitive adhesive may include acrylic-based pressure sensitive adhesive, for example, may be (meth) acrylate copolymers, crosslinkers, solvents, and the like.

The crosslinkers may be crosslinkers currently developed or to be developed and, for example, polyisocyanate compounds, epoxy resins, melamine resins, urea resins, dialdehydes, methylol polymers, etc., and may preferably include polyisocyanate compounds.

The solvents may include common solvents used in the field of resin compositions. For example, the solvents may use solvents such as: alcohol-based compounds such as methanol, ethanol, isopropanol, butanol, propylene glycol methoxy alcohol, and the like; ketone-based compounds such as methyl ethyl ketone, methyl butyl ketone, methyl isobutyl ketone, diethyl ketone, dipropyl ketone, and the like; acetate-based compounds such as methyl acetate, ethyl acetate, butyl acetate, propylene glycol methoxy acetate, and the like; cellosolve-based compounds such as methyl cellosolve, ethyl cellosolve, propyl cellosolve, etc.; hydrocarbon-based compounds such as hexane, heptane, benzene, toluene, xylene, and the like. The solvents may be used alone or combination of two or more types.

The thickness of the pressure sensitive adhesive/adhesive layer may be appropriately determined depending on a type of resins serving as the pressure sensitive adhesive/adhesive, the strength of the pressure sensitive adhesive/adhesive, the environment where the pressure sensitive adhesive/adhesive is used, and the like. According to an embodiment, the pressure sensitive adhesive/adhesive layer may have a thickness ranging from 0.01 to 50 μm in order to ensure sufficient adhesion and minimize the thickness of the optical stack and, preferably, may have a thickness ranging from 0.05 to 20 μm and, more preferably, may have a thickness ranging from 0.1 to 10 μm.

Figure 5:
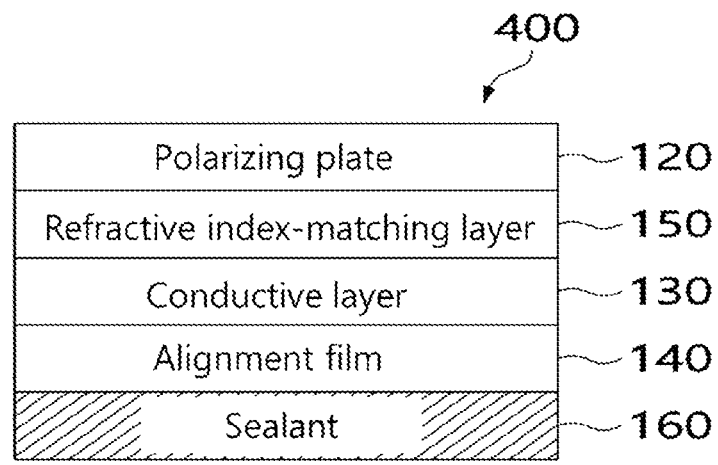
FIG. 5 is a view showing a stack structure of a variable transmittance optical stack to which a second layer is coupled according to another embodiment of the present disclosure.

FIG. 5 is a view showing a stack structure of a variable transmittance optical stack 400 to which a second layer is coupled according to another embodiment of the present disclosure. According to the embodiment of FIG. 5, the optical stack 400 may include the liquid crystal layer (not shown), the polarizing plate 120, the conductive layer 130, the alignment film 140, the refractive index-matching layer 150, and a sealant layer 160 formed at an outer portion of the liquid crystal layer. The sealant layer 160 is provided to couple the two different polarizing plates to each other, and may be located at an inactivate region, between the two different polarizing plates. Furthermore, the sealant layer 160 may secure a space where the liquid crystal layer is provided between the two different polarizing plates with the spacer.

The sealant layer 160 may include curable resins as base resins. As the base resins, UV curable resins or heat curable resins that are known to be usable for sealants in the art may be used. The ultraviolet curable resins may be polymers of UV curable monomers. The heat curable resins may be polymers of heat curable monomers.

As the base resins of the sealant, for example, acrylate-based resins, epoxy-based resins, urethane-based resins, phenol-based resins, or compounds of these resins. According to an embodiment, the base resins may be acrylate-based resins, and the acrylate-based resins may be polymers of acrylic monomers. For example, the acrylic monomers may be multifunctional acrylate. According to another embodiment, the sealant may include monomer substances in addition to the base resins. For example, the monomer substances may be monofunctional acrylate. In the specification, the monofunctional acrylate may mean compounds having one acryl group, and the multifunctional acrylate may mean compounds having two or more acryl group. The curable resins may be cured by UV irradiation and/or heating. The UV irradiation condition or heat condition may be performed appropriately within the scope that does not damage the objective of the present disclosure. In case of need, the sealant may include initiators, for example, optical initiators or heat initiators.

Figure 6:
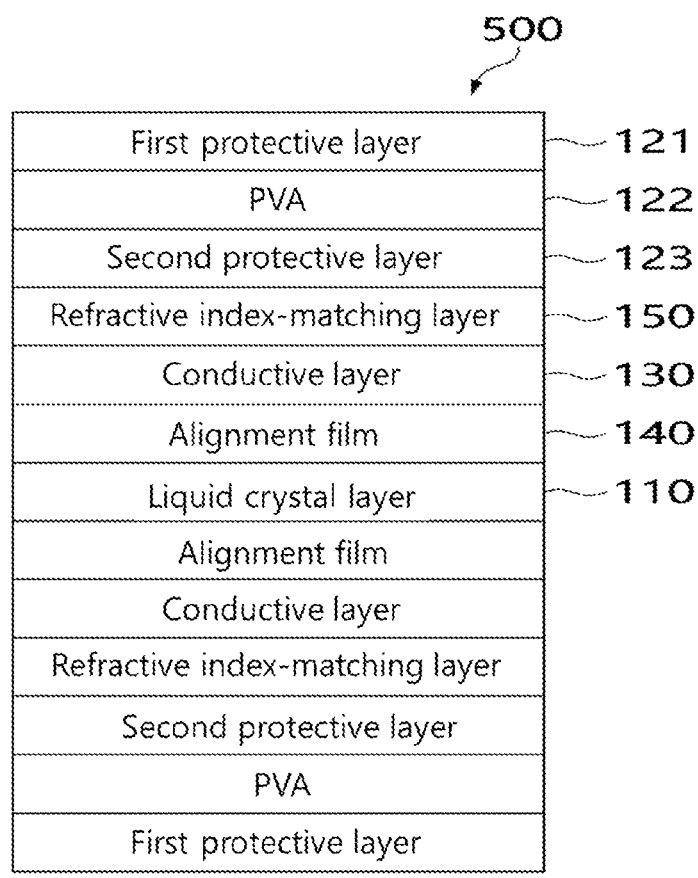
FIG. 6 is a view showing a stack structure of a variable transmittance optical stack formed according to another embodiment of the present disclosure.

FIG. 6 is a view showing a stack structure of a variable transmittance optical stack 500 formed according to another embodiment of the present disclosure.

The optical stack 500 according to the embodiment of FIG. 6 includes the liquid crystal layer 110, the polarizing plate 120, the transparent conductive layer 130, the alignment film 140, and the refractive index-matching layer 150, and the polarizing plate 120 may include a first protective layer 121, a poly vinyl alcohol (PVA) 122, and a second protective layer 123. The PVA 122 located at a center portion of the polarizing plate 120 is made of a material adjusting color implementation, and a direction and penetration of light, and may be provided as an embodiment of the polarizer mentioned above. Furthermore, the first protective layer 121 is provided to protect the PVA 122, and is provided as an embodiment of the protective layer mentioned above and, specifically, may use cellulose triacetate (TAC), and the like. Furthermore, the second protective layer 123 may be provided as an embodiment of the retardation film mentioned above and, specifically, may use cyclic olefin polymer (COP), and the like.

Figure 7:
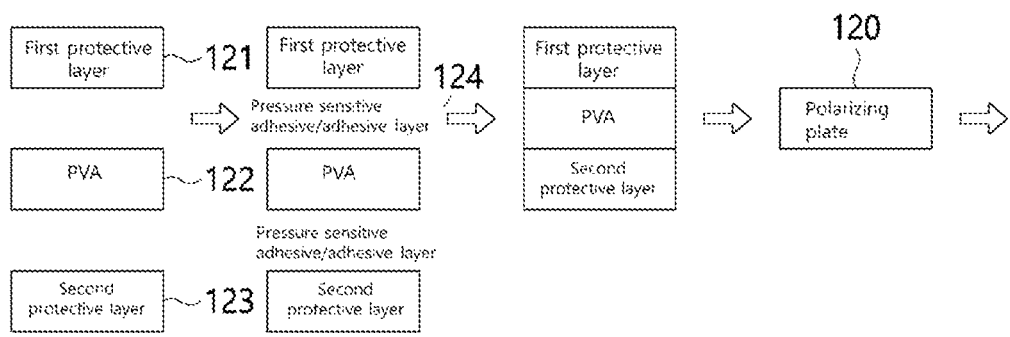
FIG. 7 is a view schematically showing steps of manufacturing a polarizing plate according an embodiment of the present disclosure.

FIG. 7 is a view schematically showing steps of manufacturing a polarizing plate according an embodiment of the present disclosure. According to the embodiment of FIG. 7, the polarizing plate 120 may include the first protective layer 121 and the second protective layer 123 on a first surface and a second surface based on the PVA 122 that is the polarizer as the center.

Furthermore, the first protective layer 121 and the second protective layer 123 may be coupled to the PVA 122 by using the pressure sensitive adhesive/adhesive 124. The pressure sensitive adhesive/adhesive 124 is not particularly limited as long as it has appropriate pressure sensitive adhesion/adhesion, transparency, and thermal stability and, for example, the pressure sensitive adhesive/adhesive 124 may be substantially the same as the pressure sensitive adhesive/adhesive 124 described above.

The bonding method of the PVA 122 and the first and second protective layers 121 and 123 by using the pressure sensitive adhesive/adhesive 124 may be performed by a bonding method commonly used in the art. For example, there may be provided a method in which a pressure sensitive adhesive/adhesive composition is applied to a bonding surface of the polarizer or the protective layer by using a flexibility method, Mayer bar coating method, Gravure coating method, die coating method, dip coating method, spray coating method, and the like, and then the polarizer or the protective layer is inserted into a niff roll, etc. to be bonded.

Figure 8:
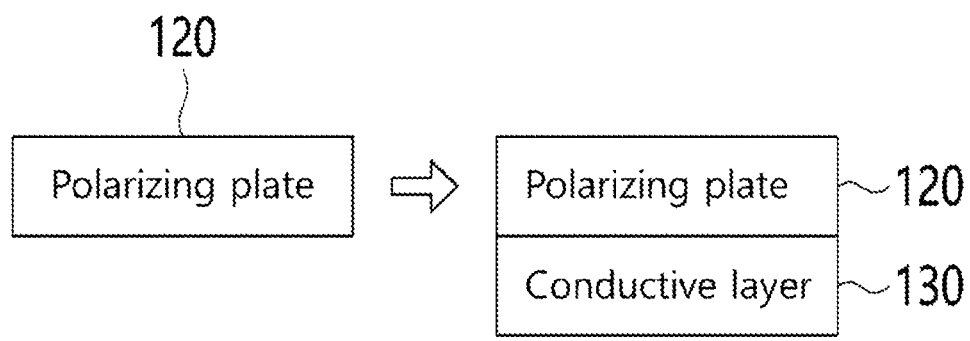
FIG. 8 is a view schematically showing a process of forming the variable transmittance optical stack by forming a conductive layer on the polarizing plate according to the embodiment of the present disclosure.

FIG. 8 is a view schematically showing a process of forming the variable transmittance optical stack by forming a transparent conductive layer on the polarizing plate according to the embodiment of the present disclosure. According to the embodiment of FIG. 8, the transparent conductive layer 130 may be directly formed on the polarizing plate 120. At this point, the polarizing plate 120 may include the protective layer as described above, and the protective layer may be used as a substrate of the transparent conductive layer 130 formed in the optical stack. The transparent conductive layer 130 is not particularly limited as long as it has optical transparency and conductivity and, for example, may be substantially the same as the transparent conductive layer 130 in FIG. 1 as described above.

Figure 9:
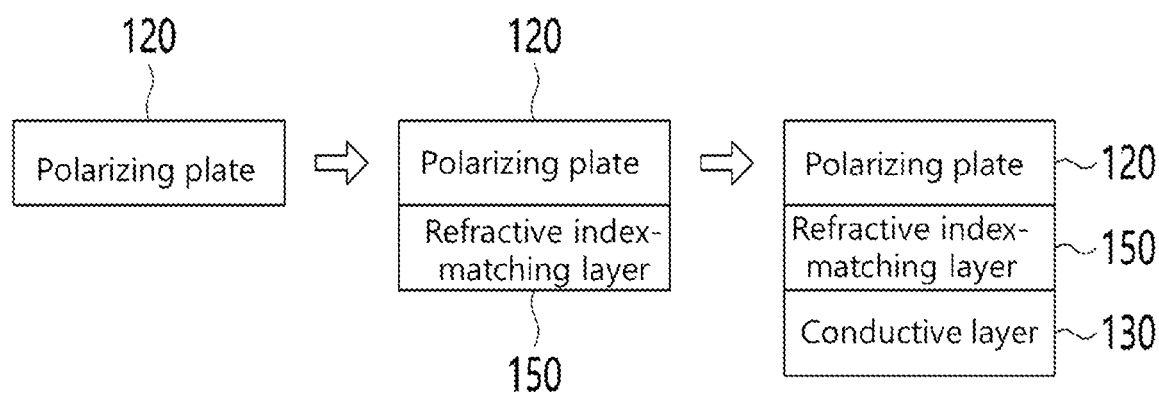
FIG. 9 is a view schematically showing a process of forming a variable transmittance optical stack to which a second layer is coupled according to another embodiment of the present disclosure.

FIG. 9 is a view schematically showing a process of forming a variable transmittance optical stack to which a second layer is coupled according to another embodiment of the present disclosure. According to the embodiment of FIG. 9, after the refractive index-matching layer 150 is formed on the polarizing plate 120, the conductive layer 130 may be stacked thereon. The refractive index-matching layer 150 is not particularly limited as long as it can compensate the difference in transmittance of the optical stack and correct a color caused from the transparent conductive layer. For example, the refractive index-matching layer 150 may be substantially the same as the refractive index-matching layer 150 in FIG. 3 as described above. The refractive index-matching layer 150 may be formed on the protective layer of the polarizing plate 120.

The transparent conductive layer 130 and the refractive index-matching layer 150 may be deposited in a depositing method commonly used in the art and, for example, may be formed using a coating method such as a spin coating method, a roller coating method, a bar coating method, a dip coating method, Gravure coating method, a curtain coating method, a dye coating method, a spray coating method, a doctor coating method, a kneader coating method, etc., a printing method such as a screen printing method, a spray printing method, an inkjet printing method, a letterpress method, an intaglio printing method, a lithography method, etc., or a method using a vacuum thin film such as a sputtering method, etc.

Figure 10:
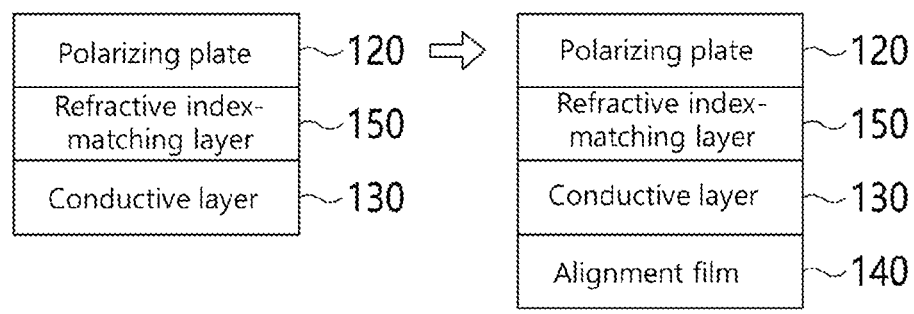
FIG. 10 is a view schematically showing a process of forming a variable transmittance optical stack to which a second layer is coupled according to another embodiment of the present disclosure.

FIG. 10 is a view schematically showing a process of forming a variable transmittance optical stack to which a second layer is coupled according to another embodiment of the present disclosure. According to the embodiment of FIG. 10, the alignment film 140 may be additionally stacked on the polarizing plate 120, the refractive index-matching layer 150, and the conductive layer 130.

The alignment film 140 is not particularly limited as long as it can provide orientation to a liquid crystal and, for example, the alignment film 140 may be substantially the same as the alignment film 140 in FIG. 2 described above.

The alignment film 140 is formed by applying and curing the alignment film coating composition on the transparent conductive layer 130, and then the composition for liquid crystal coating is applied and cured on the alignment film 140, so that the polarizing plate including the liquid crystal layer may be formed on the alignment film.

Figure 11:
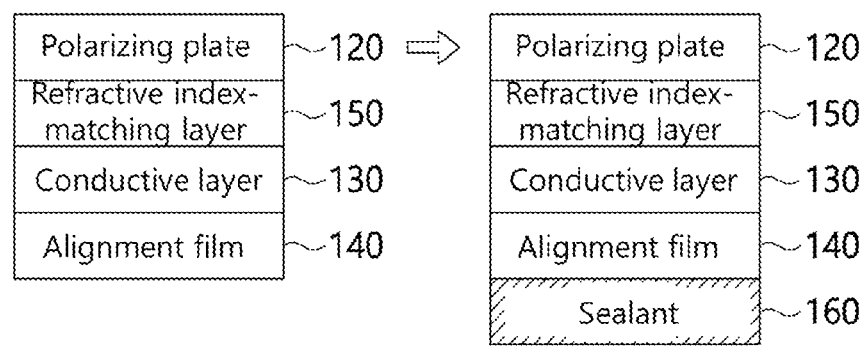
FIG. 11 is a view schematically showing a process of forming a variable transmittance optical stack to which a second layer is coupled according to another embodiment of the present disclosure.

FIG. 11 is a view schematically showing a process of forming a variable transmittance optical stack to which a second layer is coupled according to another embodiment of the present disclosure. According to the embodiment of FIG. 11, the sealant layer 160 formed at an outer portion of the liquid crystal layer may be formed on the polarizing plate 120, the refractive index-matching layer 150, the conductive layer 130, the alignment film 140. The sealant layer 160 is not particularly limited as long as it can couple the two different polarizing plates to each other and protect the liquid crystal layer from the external space and, for example, the sealant layer 160 may be substantially the same as the sealant layer 160 of FIG. 5 described above.

The sealant layer 160 may be formed in a method commonly used in the art and, for example, may be formed drawing a sealant at an outer portion of the liquid crystal layer (i.e., inactivate region) with a dispenser having a nozzle. Then, the optical stack of the present disclosure may be manufactured by bonding and curing the optical stack, etc. of FIG. 10, and curing of the sealant may be performed in an UV irradiation and/or heating method.

Furthermore, in addition to the variable transmittance optical stack, the present disclosure includes a smart window including the same. Furthermore, the present disclosure includes a vehicle in which the smart window is applied to at least one of front windows, rear windows, side windows, sunroof windows, or inner partitions, and a window and a door for a building, which include the smart window.

INDUSTRIAL APPLICABILITY

The variable transmittance optical stack according to the present disclosure does not include a separate or additional substrate for forming the conductive layer as the conductive layer is directly formed on one surface of the polarizing plate, so that the thickness thereof may be significantly reduced in comparison to the thickness of the conventional optical stack.

The invention claimed is:
1. A variable transmittance optical stack comprising:
polarizing plates stacked on both surfaces thereof with a liquid crystal layer driven in response to an electric field and located therebetween, wherein each of the polarizing plates comprises a polarizer and a protective layer formed on at least one surface of the polarizer, wherein a transparent conductive layer is formed by directly contacting with each of the polarizing plates, wherein the transparent conductive layer is formed by directly contacting with each of the polarizing plates without a separate substrate between each of the polarizing plates and the transparent conductive layer, wherein the variable transmittance optical stack further comprises a refractive index-matching layer between each of the polarizing plates and the transparent conductive layer, wherein the refractive index-matching layer has a refractive index ranging from 1.4 to 2.6, and wherein a total light transmittance of the optical stack changes in response to application of voltage.

2. The variable transmittance optical stack of claim 1, wherein the transparent conductive layer is formed by directly contacting with each of the polarizing plates with a highly adhesive layer between each of the polarizing plates and the transparent conductive layer.

3. The variable transmittance optical stack of claim 1, wherein the transparent conductive layer comprises one or more selected from a group consisting of transparent conductive oxide, metal, carbonaceous material, conductive polymers, conductive ink, and nanowires.

4. The variable transmittance optical stack of claim 1, wherein each of the polarizing plates further comprises an optical functional layer.

5. The variable transmittance optical stack of claim 4, wherein the optical functional layer comprises a retardation film.

6. The variable transmittance optical stack of claim 1, wherein the protective layer comprises one or more selected from a group consisting of polyethylene terephthalate, polyethylene isophthalate, polyethylene naphthalate, polybutylene terephthalate, cellulose diacetate, cellulose triacetate, polycarbonate, polyethylene, polypropylene, polymethyl (meth) acrylate, polyethyl (meth) acrylate, and cyclic olefin-based polymer.

7. The variable transmittance optical stack of claim 1, wherein each of the polarizing plates has a thickness ranging from 30 to 200 µm.

8. The variable transmittance optical stack of claim 1, wherein the liquid crystal layer comprises an alignment film formed on at least one surface thereof.

9. The variable transmittance optical stack of claim 1, wherein the liquid crystal layer is driven by any one driving method selected from a group consisting of twisted nematic, super-twisted nematic, in-plane switching, fringe field switching, plane line switching, advanced high-performance IPS, polymer sustained alignment, and vertical alignment.

10. The variable transmittance optical stack of claim 1, wherein the liquid crystal layer comprises one or more selected from a group consisting of a ball spacer and a column spacer.

11. The variable transmittance optical stack of claim 10, wherein the ball spacer has a diameter ranging from 1 to 10 µm.

12. The variable transmittance optical stack of claim 10, wherein the ball spacer has an occupancy area in the liquid crystal layer, which ranges from 0.01 to 10% of the area of the liquid crystal layer.

13. A manufacturing method for the variable transmittance optical stack of claim 1.

14. A smart window comprising the variable transmittance optical stack of claim 1.

15. A vehicle in which the smart window of claim 14 is applied to at least one of front windows, rear windows, side windows, sunroof windows, or inner partitions thereof.

16. A window and a door for a building, which comprise the smart window of claim 14.

* * * * *